Sept. 21, 1965 B. L. CORDRY 3,208,066
DOPPLER SYSTEM RAMP TEST SET
Filed Sept. 20, 1962 2 Sheets-Sheet 2

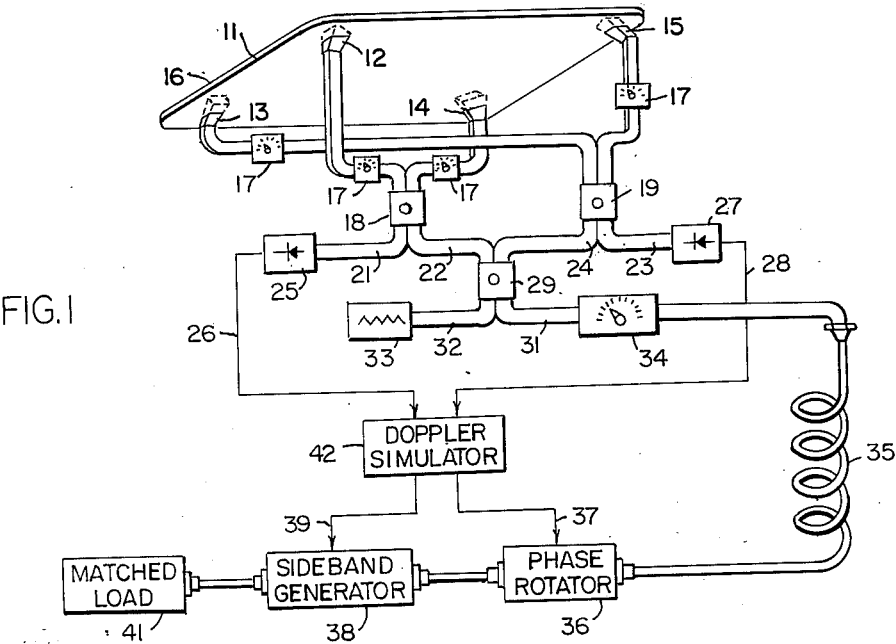
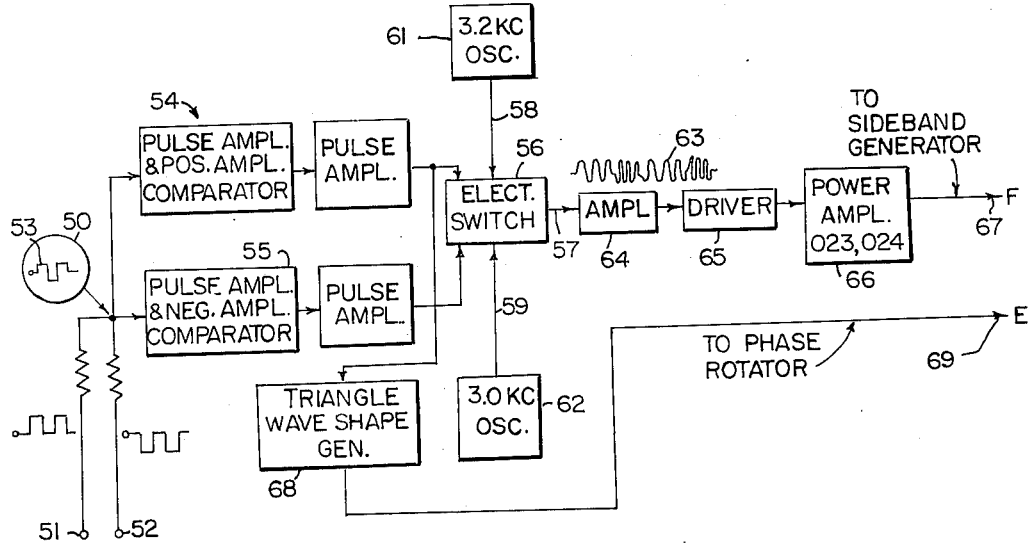

INVENTOR.
BURTON L. CORDRY
BY
Killman, Smith & Lamb
ATTORNEYS

United States Patent Office 3,208,066
Patented Sept. 21, 1965

3,208,066
DOPPLER SYSTEM RAMP TEST SET
Burton L. Cordry, Glenarm, Md., assignor to The
Bendix Corporation, Baltimore, Md., a corporation
of Delaware
Filed Sept. 20, 1962, Ser. No. 224,977
6 Claims. (Cl. 343—17.7)

This invention relates generally to Doppler system test sets and more particularly to a test set which is self-contained and suitable for use on the ramp for checking a Doppler navigation system which is installed in an aircraft.

With the widespread adoption of Doppler navigation systems for use in aircraft as either the primary or secondary navigation aid, it has become necessary for some means to be employed for checking the operation and accuracy of the Doppler system which is installed in an aircraft prior to the aircraft's departure. Prior art test sets for this purpose have generally been quite complex and difficult to maintain in proper calibration since the requirements of such a system call for the processing of microwave signals from each beam of the Doppler system antenna with an appropriate modulation introduced to represent the Doppler shift when the energy in the beam is returned to the Doppler system antenna. As all modern Doppler systems employ a multiple number of beams, it becomes imperative for any test system to manipulate the energy from each beam with known precision in order that the relative levels of energy emanating on each beam from the Doppler system can be determined as well as for the purpose of returning along each beam to the Doppler antenna the properly modified return signal simulating an actual ground reflection along that beam when the aircraft is flying at a calibrated speed and drift angle. In addition to the difficulties encountered heretofore in obtaining the requisite precision and calibration accuracy, the prior art devices have employed relatively expensive apparatus such as travelling wave tubes which in addition to being expensive and delicate require some considerable care in maintaining the desired adjustments when installed in a field test unit, such as a ramp test set.

In accordance with the present invention, a simplified Doppler system test set is provided for a Doppler system installed in an aircraft with suitable modifications being available for adapting the test set to different aircraft types. When the test set is used with an aircraft for which it is adapted, the microwave signals on the antenna beams of the Doppler system installed in the aircraft are processed by circuit elements which in the most part are simple linear reciprocal devices capable of maintaining a high degree of reproducibility in the measurements involved and of being set with known attenuation and delay values which can be optimized for the system under test and employed as variable parameters in order to make more meaningful the measurements which can be accomplished with the test set.

One of the problems which confronts the users of Doppler navigation systems is the difficulty of conducting adequate operational tests of equipment installed in an aircraft without resorting to actual flight tests. In particular, for airline use where aircraft are constantly in use during the period between scheduled maintenance layovers it is essential that a complete ramp check be performed especially where the Doppler system is to be used as the primary navigation aid.

The only test of the Doppler system which can be considered, of course, is one which receives the energy transmitted by the system and returns the energy to the system after it has been characterized in the same manner as the reflected energy from the ground would be when received on the moving aircraft at a normal altitude. For this purpose the present invention provides a calibrated amount of attenuation and delay in a transmission path for the microwave energy transmitted by the system and returns the attenuated and delayed energy to the Doppler system with amplitude modulation at frequencies corresponding to the Doppler frequency shift that would be encountered at a predetermined ground speed and drift angle. This amplitude modulation appears as sidebands on the modulation components of the reflected energy which are detected by the Doppler system in the same manner that the audio side-step frequencies produced by a Doppler shift are detected, and hence the detected audio components are processed just as though they originated from a Doppler shift.

It is accordingly a primary object of the present invention to provide an improved self-contained Doppler system test set capable of making quantitative measurements on a Doppler navigation system installed in an aircraft.

Other objects and features of the invention will be apparent from the following detailed description taken in conjunction with the accompanying drawings wherein:

FIG. 1 is a diagram representing the overall system including the microwave transmission circuits in accordance with the invention;

FIG. 2 is a block diagram of a Doppler shift simulator circuit used in the invention;

Figure 3:
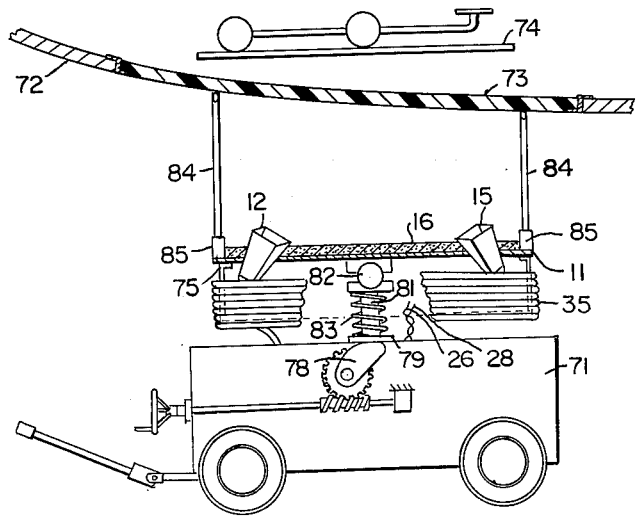
FIG. 3 is a view in elevation partly in section showing the test set in accordance with the invention positioned beneath an aircraft.

Referring now to FIG. 1, the arrangement of a particular embodiment of the invention is shown adapted for a sequential X-beam fixed antenna Doppler navigation system. While this particular embodiment has been chosen for the purposes of disclosing the present invention, it will be apparent to those skilled in the art that the system may be modified to accommodate the beam configuration of other types of Doppler navigators and in the processing of microwave signals for such different type navigation system duplication of various elements may be required where simultaneous beams are present in any particular Doppler system type. Such modifications are considered to be within the scope of the invention, as defined in the appended claims.

In FIG. 1, a platform 11 is provided to locate in fixed position an angular orientation for horn antennae 12, 13, 14 and 15. The horns 12–15 project through the platform 11 and a layer 16 of microwave absorbent material which extends thereover. The radiation axes of the horns 12–15 point along the axes respectively of the four beams which radiate from a Doppler system antenna with which the test set is adapted to be used whenever the platform 11 is positioned relative to the Doppler system antenna as hereinafter described. With the platform 11 so positioned relative to a Doppler system installed in an aircraft, the respective horns 12–15 are located to receive the maximum beam energy from the Doppler system provided the Doppler system beam locations are correct and have not shifted since they were last adjusted. With this positioning and with the horns 12–15 having identical gain characteristics, the magnitude of energy received by each horn can be employed as a measure of the uniformity between the four beams transmitted by the Doppler system. In order to assure that this magnitude measurement may be made with precision, a calibration attenuator 17 is positioned in the waveguide connected to each of the horns 12–15. By means of the attenuator 17, the slight variations in receptivity of the horns 12–15 and the transmission characteristics of the connecting waveguide can be compensated for and the transmission magnitude for each horn can be standardized during the calibration procedure for the test set.

The diagonally opposite horns 12 and 14 are connected to a 3db coupler 18 and the opposite diagonal horns 13 and 15 are connected to a second 3db coupler 19. The 3db couplers 18 and 19 may be short slot hybrids or any similar coupling device which receives energy from either of its input horns and divides it equally between two outputs. The coupler 18 has outputs 21 and 22 and the coupler 19 has outputs 23 and 24. While the connections 21–24 have been designated outputs, in actual operation the couplers 18 and 19 are true reciprocal devices, and hence energy applied to the waveguides 21–24 is equally divided and returned to the respective horn pairs 12–14 or 13–15, respectively. The output 21 of coupler 18 is coupled to a detector 25 to supply a control signal on line 26 corresponding to the interval during which either of the inputs of the coupler 18 are energized from horn 12 or horn 14. In similar manner the waveguide 23 supplies a detector 27 which detects energy input to the coupler 19 from either horn 13 or horn 15 to produce a corresponding control signal on line 28.

The waveguides 22 and 24 are connected to a third 3 db coupler 39 which divides input energy thereto from either waveguide 22 or waveguide 24 into two equal components appearing at output waveguides 31 and 32. The energy in waveguide 32 is absorbed in a matched load 33. The combined energy in waveguide 31 represents the sequential energy levels received by the horns 12–15 inclusive from the Doppler system.

The energy entering waveguide 31 from the coupler 29 passes through a calibrated microwave attenuator 34 and a fixed precision delay line 35 from which it is applied to a phase rotator 36. The attenuator 34 is calibrated and adjustable to make provision for the introduction of attenuation corresponding to that experienced by a microwave energy transmitted from the aircraft and reflected from the ground back to the aircraft when the aircraft is at an altitude at which operation of the system is marginal. By being able to set the attenuation of attenuator 34 both above and below this value, the actual expected operating altitude of the system can be checked, as well as the reserve available representing the additional db of attenuation which the system can tolerate before the reflected signal is no longer usable.

The delay introduced by the delay lin 35 is effective for both direction of signal passage therethrough and the round trip delay is selected to correspond to the calibration altitude simulated by the attenuation introduced by the attenuator 34. This delay is necessary primarily in F.M./C.W. systems where the altitude hole response characteristic introduces considerable attenuation at various altitudes and hence the exact delay must be selected at the top of the altitude hole response characteristic adjacent the selected simulated altitude or at a calibrated point along the slope of the characteristic in order to account for the corresponding attenuation introduced by the altitude hole characteristic.

The phase rotator 36 is preferably a ferrite device operable upon the application of a varying D.C. control current on line 37 to progressively shift the phase of the microwave energy passing therethrough by an amount greater than a multiple of 180°. The actual control current fluctuates and the purpose of producing the resulting phase shift on a cyclic basis by the device 36 is to mask any variations in response which could occur upon reflection of a signal from a reflector located a fixed distance from the source. Varying the effective length of the line continuously by intervals which are in excess of 180° in electrical length produces an average response that eliminates any effects of a carrier phase null which is somewhat analogous to standing waves in the energy returned to the Doppler system.

The energy passing through the phase rotator 36 from the delay line 35 proceeds to a sideband generator 38 which may be a ferrite rotator type device controlled in accordance with current applied on line 39. The sideband generator 38 has two conditions corresponding to complete transmission of energy received from the phase rotator 36 and complete reflection of energy so received. These two conditions are determined by the degree of rotation effected by the ferrite within the sideband generator 38 in a known manner such that when the energy is aligned with a transmission waveguide, complete transmission is accomplished to a matched load 41 where the energy is absorbed. When the ferrite in the sideband generator 38 is in a state which rotates received energy to be not aligned with the transmission waveguide, complete reflection occurs. By application of a sinusoidal control signal on line 39 the sideband generator 38 thus either transmits or reflects energy with a sinusoidal variation between maximum transmission and absorption in load 41 and maximum reflection back to the phase rotator 36. The energy thus passing from the sideband generator 38 to the phase rotator 36 is amplitude modulated sinusoidally and proceeds back through the delay line 35, the attenuator 34 and the couplers 29, 19 and 18 to the respective horns 12–15 for transmission along the axes of the beams respectively in the Doppler navigation system.

This amplitude modulation appears on all of the components of the originally transmitted energy and in an F.M./C.W. system the various sidebands of the transmission due to the modulation are returned with sidebands thereon corresponding to the frequency of the amplitude modulation produced in the sideband generator 38. Thus if the control of the sideband generator 38 is at the frequency of the Doppler shift corresponding to a predetermined ground speed and drift angle, the Doppler system will be able to process the radiation emanating from the horns 12–15 and indicate this predetermined ground speed and drift angle on the indicators within the aircraft. Since in a fixed antenna system drift angle is indicated by different Doppler shifts for the diagonal pair of beams, the frequency with which the sideband generator 38 is operated is controlled by a Doppler simulator 42 which applies a different modulation frequency to the energy for the diagonally opposite beam pairs corresponding to the selected drift angle. The Doppler simulator 42 may also provide the cyclic phase shift signal to the phase rotator 36 on line 37, but this need not be any fixed relation to the beam sequence program.

Referring now to FIG. 2, a suitable circuit for the Doppler simulator 42 of FIG. 1 will be described. The detectors 25 and 27 of FIG. 1 supply opposite polarity switching square waves to input terminals 51 and 52, respectively. Since the four antenna beams appear in regular sequence to be detected by the horns 12–15, the positive and negative voltages occurring at terminals 51 and 52 appear in alternation and are thus combined into a bipolar square wave 53 which is applied as an input signal to two pulse amplifier channels 54 and 55. As long as the energy detected by each of the horns 12–15 is equal, the symmetrical bipolar square wave 53 will be obtained and can be observed on oscillograph 50 as an indication of proper transmission level for each of the beams in the Doppler system. In the event that any of the beams are transmitted with a power level different than that of the other beams this fact will be reflected by changes from the symmetrical square wave appearance of the wave form 53, and a sensing circuit can be employed that rejects any excessive asymmetry. For this purpose the amplifier channels 54 and 55 include positive and negative amplitude comparators which develop a self-bias at the normal pulse level so as not to pass pulses of less than normal amplitude. Switch faults in the Doppler system produce such abnormal pulse amplitudes and the failure of the amplitude comparators 54, 55 to pass such pulses prevents a normal switch sequence in switch 56 with the result that the Doppler system in the aircraft senses the erroneous operation.

The outputs of the amplifier channels 54 and 55 are applied to an electric switch 56 which performs the function equivalent of a single pole double throw switch to connect output 57 thereof alternately to two inputs 58 and 59. The input 58 is supplied from a 3.2 kc. oscillator 61 and the input 59 is supplied from a 3.0 kc. oscillator 62. The normal operation of the switch 56 therefore in response to the switching pulses applied thereto from the amplifiers 54 and 55 is to produce at output 57 an audio signal made of up intervals of 3 kc. alternating with intervals of 3.2 kc. These modulation frequencies are selected to represent a predetermined ground speed and drift angle and correspond to the audio frequencies which would be detected as the Doppler shift occurring at diametrically opposite beams in a fixed antenna X-beam Doppler system for a ground speed of a given magnitude and a drift angle of a given number of degrees different from zero. Although the actual Doppler shift between fore and aft beams would be of opposite sense in such a system, as detected and processed in the form of audio components, the sign of the Doppler shift is lost and hence only two actual audio frequencies need to be reproduced in the sequence of beam switching to represent the Doppler signal for the predetermined ground speed and drift angle to be simulated. This wave form is represented at 63 in FIG. 2 and after appropriate amplification in amplifier stages 64, 65 and 66 is available at output terminal 67 for application to line 39 as the input to the sideband modulator 38 in FIG. 1.

Although the control of the phase rotator 36 of FIG. 1 need not bear any particular relation to the beam sequence timing, a convenient arrangement for introducing the phase shift provided by the phase rotator 36 is indicated in FIG. 2. For this purpose the pulse wave form from amplifier 54 is applied to a triangle wave shape generator 68 which produces an output on terminal 69 in the form of a triangular wave form which can be applied on line 37 to the phase rotator 36 of FIG. 1 to produce a cyclic variation in phase over an interval of 180° at the microwave frequency or a multiple thereof for the purpose of averaging fixed phase signal combinations which would tend to disturb the operation of the system.

Referring now to FIG. 3, a view showing the system as used provides a cart 71 or other suitable vehicle capable of being rolled into position beneath an aircraft 72 in the region of radome 73 which is flush with the aircraft's skin but transparent to the microwave energy beams radiated by the Doppler navigation system antenna 74. The cart 71 carries the antenna platform 11 which is coated on its upper surface with microwave absorbent material 16 and adapted to be extended by the extension of a telescoping shaft 81. The platform 11 is raised by the action of a cam 78 which operates against a plate 79 slidably mounted on the supporting shaft 81. The shaft 81 supports at its upper end a ball joint 82 which in turn supports the platform 11. A compression spring 83 located between the lower portion of the ball joint 82 and the plate 79 provides for the platform 11 to be urged against the air frame of the aircraft as the cam 78 is raised beyond the point where spacer bars 84 make contact with the skin of the aircraft.

The spacer bars 84 are three in number and are adapted to make contact with indexing flats which are provided on the bottom surface of the radome 73. Thus as cam 78 is rotated, the platform 11 is raised until the locating bars 84 contact the indexing flats on the lower surface of the radome 73 and the assembly is urged into this predetermined location relative to the antenna 74 by further rotation of the cam 78 to compress the spring 83. In this manner the relative position of the platform 11 and the antenna 74 is maintained without variation even though slight motion of the aircraft occurs due to personnel boarding the aircraft during the checkout procedure and the like.

All microwave components of the system of FIG. 1 are suspended from the under side of the platform 11 in fixed position relative to the horns 12–15. This assembly may be within a suitable enclosure, the walls of which are indicated at 75. The delay line is coiled around the enclosure 75 and provides a flexible connection between the attenuator 34 (FIG. 1) mounted under the platform 11 and the phase rotator 36 (FIG. 1) which is located within the cart 71. Similarly the lines 26 and 28 from the detectors 25 and 27 provide a flexible electrical connection between the movable and fixed portions of the test set. In this manner the microwave assembly can be free to move into position beneath the aircraft as shown in FIG. 3 without any changes occurring in the calibration of the different waveguide paths. By supporting this assembly on the ball joint 82, the correct position of the horns 12–15 relative to the aircraft antenna 74 can be achieved irrespective of the attitude of the aircraft.

Figure 4:
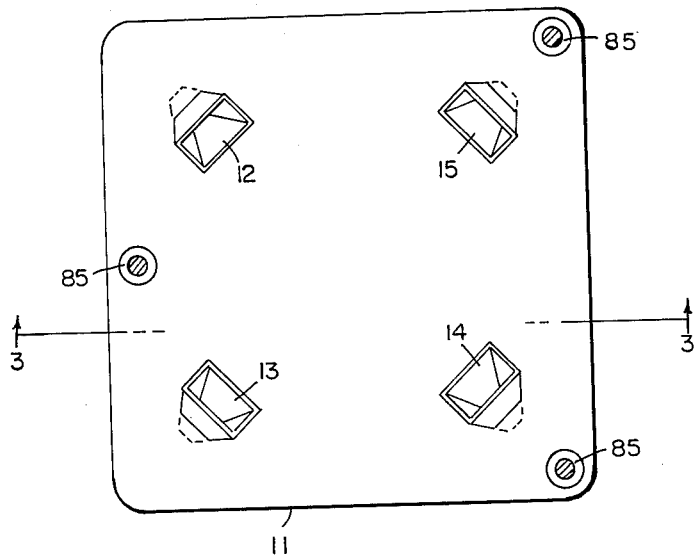
FIG. 4 is a plan view of the antenna mounting platform of the test set.

The relation of the position for the locator rods 84 and the general layout of the platform 11 can be best seen in FIG. 4 where three sockets 85 are located, as shown, relative to the horns 12–15. By providing a set of locator bars 84 which fit in the sockets 85 for each aircraft type with which the test is to be used, the proper location of the platform 11 relative to the antenna 74 can be achieved.

While a specific embodiment of the invention has been disclosed for the purpose of describing the present invention, it will be recognized that many morifications can be made without departing from the true scope of the invention which is defined by the appended claims.

What is claimed is:

1. A test set for a sequential X-beam Doppler system comprising four horn antennae mounted in fixed position for receiving, respectively, the energy transmitted on individual antenna beams by said system; a pair of couplers for combining the energy received by diagonal pairs of said horns; a third coupler for combining the combined outputs of said pair of couplers; a transmission path coupled to the output of said third coupler, said path including delay means, attenuator means, phase shift means and a selective transmission reflection termination device; a matched load terminating the transmission path in said device; and means for operating said device to vary the reflection characteristic thereof at two frequencies alternately applied in synchronism with the outputs of said pair of couplers, respectively, for modulating energy reflected along said path corresponding to a predetermined ground speed and drift angle.

2. Apparatus according to claim 1 in which said delay means introduces a predetermined delay time for reflected signals the time equivalent of a predetermined altitude and said attenuator means is adjustable to reduce the level of said reflected signals to correspond to a predetermined minimum useable signal.

3. Apparatus according to claim 1 and including means responsive to relative variations in the outputs of said pair of couplers to alter the synchronism between said two frequencies and said ouputs of said pair of couplers thereby altering the modulation of said energy reflected along said path to not correspond to said predetermined ground speed and drift angle.

4. A test set for a sequential X-beam Doppler system comprising four antennae mounted in fixed position aligned for receiving, respectively, the energy transmitted on individual antenna beams by said system; first and second short slot couplers each of which is connected to a separate diagonal pair of said antennae, a third short slot coupler connected to an output from each of said first and second couplers, means for deriving alternate control signals from the remaining outputs of said pair of couplers, a calibrated attenuator connected to an output of said third coupler, a matched termination connected to the remaining output of said third coupler, a delay line connected to said attenuator, a ferrite phase shifter connected to said delay line, a ferrite rotator connected to said phase shifter for selectively absorbing or reflecting energy received through said phase shifter, means for generating two audio frequencies, means responsive to said control signals for alternately applying said two audio frequencies to said ferrite rotator for amplitude modulating energy reflected thereby at said frequencies, and means for cyclically varying said phase shifter to vary the phase of reflected energy through multiple half-wavelengths of said energy.

5. A test set for a multi-beam Doppler system comprising a portable carriage containing said test set and adapted to be located beneath an aircraft; an antenna platform on said carriage; means for elevating and locating said platform in a fixed predetermined position reltive to the antenna of said system, said elevating means including spring loading of said platform against the locating means and said aircraft with sufficient range of vertical travel to follow variations in vertical position of said aircraft without altering said predetermined position relative to said antenna, means on said platform for receiving energy from all of said beams, and means on said carriage for attenuating, delaying and modulating energy received from the beams of the antenna of said system, and radiating the attenuated, delayed and modulated energy back along said beams, respectively.

6. A test set for a multi-beam Doppler system which includes a downward facing antenna, comprising a portable carriage containing said test set and adapted to be located beneath said antenna, a platform, pivotal means supporting said platform on said carriage, locating means extending from said platform to contact reference surfaces adjacent said antenna, whereby said platform is maintained in a fixed predetermined position relative to said antenna irrespective of minor variations in the relative positions of said antenna and said carriage, means on said platform for receiving energy from all of said beams and for radiating energy in a return path along said beams, means for attenuating, delaying and modulating said received energy, and means supplying said attenuated, delayed and modulated energy to said platform radiation means for return along the paths whence said energy was received.

References Cited by the Examiner
UNITED STATES PATENTS

| | | | |
|---|---|---|---|
| 2,838,753 | 6/58 | O'Brien et al. | 343—105 |
| 2,922,157 | 1/60 | McShan | 343—17.7 |
| 2,952,015 | 9/60 | Eakin | 343—17.7 |
| 3,018,478 | 1/62 | Skillman et al. | 343—17.7 |
| 3,110,026 | 11/63 | Barbour et al. | 343—17.7 |
| 3,138,797 | 6/64 | Steinberg | 343—17.7 |

CHESTER L. JUSTUS, *Primary Examiner.*